Oct. 14, 1924.                                                                 1,511,882
                        K. G. HADJIEFF
                 CORNER POST FASTENER FOR BEDSTEADS
                       Filed May 24, 1923
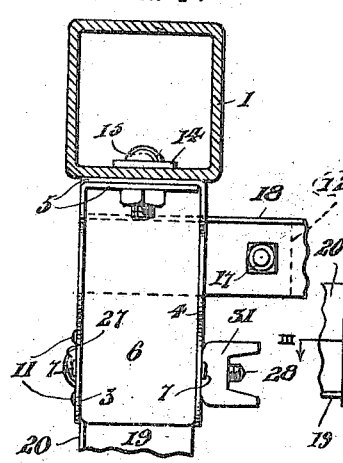
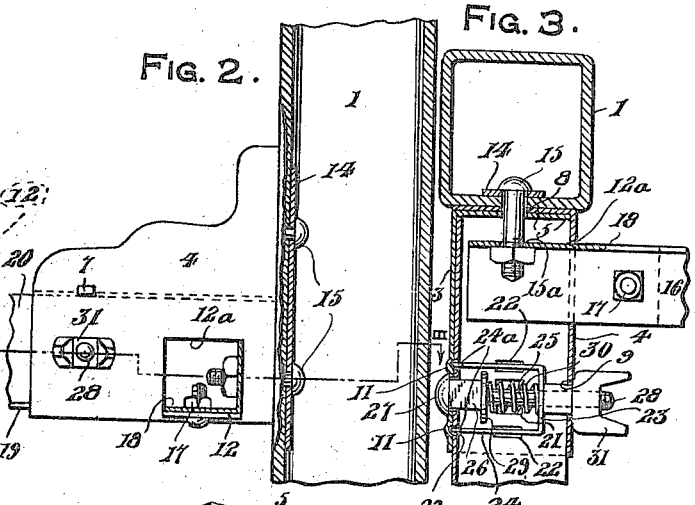
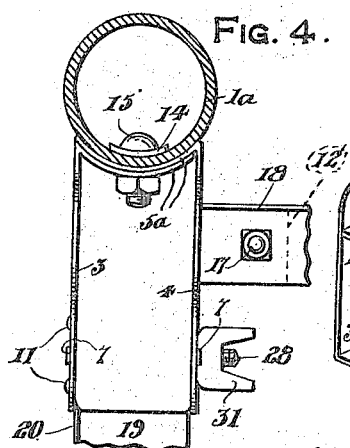
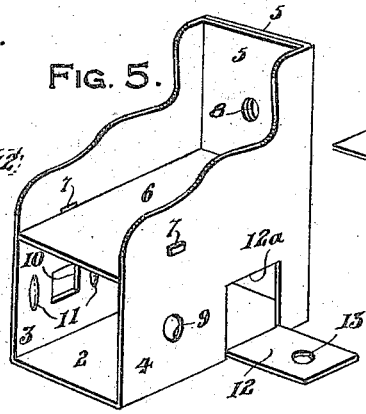
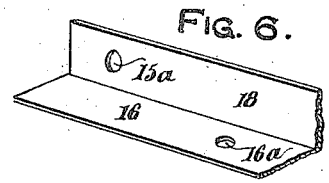
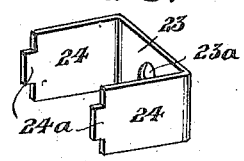
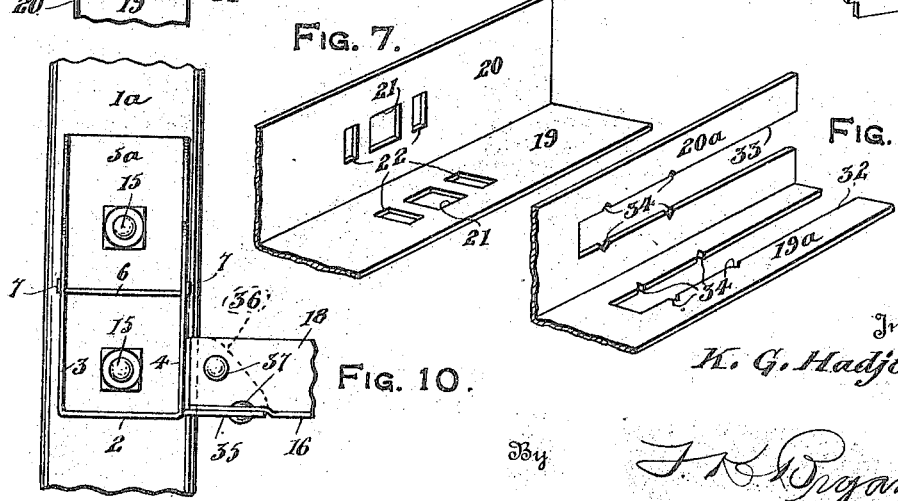
Inventor
K. G. Hadjieff
By F. K. Bryant
   Attorney Patented Oct. 14, 1924.

1,511,882

UNITED STATES PATENT OFFICE.

KOIJ G. HADJIEFF, OF WARREN, OHIO.

CORNER-POST FASTENER FOR BEDSTEADS.

Application filed May 24, 1923. Serial No. 641,227.

*To all whom it may concern:*

Be it known that I, KOIJ G. HADJIEFF, a citizen of Bulgaria, residing at Warren, in the county of Trumbull and State of Ohio, have invented certain new and useful Improvements in Corner-Post Fasteners for Bedsteads, of which the following is a specification.

This invention relates to certain new and useful improvements in corner post fasteners for bedsteads and has for one of its objects to provide a socket member permanently attached to each corner post with the head and foot rails permanently attached thereto while the side rails are removably secured at their ends in the socket members.

Another object of the invention is to provide a corner post fastener wherein a socket member carried by each corner post has a side rail end removably secured therein with a tensioned clamping device associated with each rail end and socket member for anchoring the side rails to the corner post.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a horizontal sectional view taken through one of the corner posts, that is rectangular in cross-section and showing the corner post fastener in top plan view with ends of a cross and side rail anchored therein, Figure 2 is a fragmentary vertical sectional view through the corner post showing the corner post fastener in side elevation, Figure 3 is a horizontal sectional view taken on line III—III of Fig. 2 showing the screw clamp device for anchoring the side rail in the socket member, Figure 4 is a horizontal sectional view, similar to Fig. 1 showing a circular corner post for bedsteads, Figure 5 is a perspective view of the corner post fastener or socket member, Figure 6 is a fragmentary perspective view of one of the cross rails, Figure 7 is a fragmentary perspective view of one end of a side rail, Figure 8 is a perspective view of the strap member of the screw clamp device, Figure 9 is a fragmentary perspective view showing the modified construction of one end of a side rail, and Figure 10 is a fragmentary end elevational view showing a modified mounting for the ends of the cross rails.

Referring more in detail to the accompanying drawing, the fastener or socket member as shown in Figs. 1 to 3 is illustrated as mounted upon a corner post 1 that is hollow and rectangular in cross-section and to which fastener the cross and side rails of the bed are attached. The corner post fastener or socket member which is shown more clearly in Fig. 5 is formed from a piece of metal bent to provide a bottom wall 2, side walls 3 and 4 with corresponding ends of the side walls bent at right angles to each other to provide overlapping end sections 5 constituting an inner end wall for the fastener. The lower end of the inner end wall section 5 carried by the side wall 3 is inwardly bent at right angles to provide an upper wall 6 positioned intermediate the upper and lower edges of the side walls 3 and 4 with opposite edges of the wall section 6 carrying outwardly directed lugs 7 projecting through openings in the side walls 3 and 4 to properly anchor the same in position. The overlapping end wall sections 5 are provided with registering openings 8, a similar opening 9 being provided in the side wall 4 while a rectangular opening 10 is formed in the side wall 3 in alinement with the opening 9, the side wall 3 at each side of the rectangular opening 10 being provided with a depression 11 as clearly shown in Figs. 3 and 5. An arm 12 is struck out from the side wall 4 at the lower end thereof to assume a horizontal position and is provided with an opening 13.

In mounting the fastener or socket member upon the post 1, the overlapping end wall sections 5 are placed in engagement with the post as shown in Figs. 1 to 3, a face plate 14 engaging the inner face of the post as illustrated with screw fasteners 15 passing through the face plate 14, adjacent wall of the post 1 and the end wall sections 5 of the socket member. The cross rails carried by the corner post forming the head and foot members of the bedstead are of angle iron construction, the lower flange 16 resting upon the arm 12 and extending through the opening 12ª through the interior of the socket member, a fastening device 17 passing through the opening 16ª for anchoring the lower horizontal flange 16 to the arm 12 in passing through the flange and opening 13 in the arm, while the vertical flange 17 of the cross member is engaged by the adjacent screw fastener 15 passing through the opening 17ª as clearly shown in Figures 2 and 3. The side rails are also of angle iron construction, embodying a lower horizontal flange 19 and an upper vertical flange 20, each of the flanges 19 and 20 being provided with relatively large rectangular openings 21 and laterally positioned relatively smaller openings 22. The ends of the side rails are received in an adjacent socket member with the openings 21 registering with the openings 10 while the openings 22 overlie the depressions 11 as shown in Fig. 3. A U-shaped strap comprising a cross head 23 and side legs 24 has an opening 23ª formed in the cross head and extension lug 24ª carried by the outer end of each leg 24. A bolt 25 having a squared shank portion 26 adjacent the head 27 is threaded at its outer end as at 28, the square portion 26 of the bolt extending through the registering openings 10 and 21 in the side wall 3 of the socket member and the adjacent flange 20 of the side rail, a washer 29 being positioned on the bolt 25 engaging the squared portion 26 thereof while a coil spring 30 surrounds the bolt between the washer 29 and the cross head 23 of the U-shaped strap, the threaded end of the bolt extending through the opening 23ª in the strap and also through the opening in the side wall 4 of the socket member upon which a thumb nut 31 is threaded as illustrated in Fig. 3. Upon tightening the thumb nut, the U-shaped strap has the lug extensions 24ª carried by the side legs 24 thereof passed through the openings 22 in the side rail and received in the depressions 11 as shown in Fig. 3 to anchor the side rails in the socket members and upon loosening the thumb nut 31, the spring 30 will force the lug extensions 24ª out of the openings 22 and depressions 11. The openings 21 and 22 are formed in both flanges 19 and 20 of the side rails permitting the same to be interchangeable or capable of mounting at either side of the bedstead.

A modified form of fastener or socket member is illustrated in Fig. 4, wherein the end walls 5ª thereof are of arcuate formation for engagement with a circular bed post 1ª, it being understood that the end wall sections 5 may be formed into the desired configuration for association with a similarly formed corner post.

A modified form of rail end for the side rails is shown in Fig. 9, wherein the horizontal and vertical flanges 19ª and 20ª are longitudinally slotted as at 32 and 33 respectively with notches 34 formed in the edge walls of the slots 32 and 33 to be engaged by the lug extensions 24ª of the U-shaped strap.

Another form for mounting the ends of the cross rails is shown in Fig. 10 wherein the struck-out arm 35 carries a perpendicular end flange 36, the horizontal flange 16 resting on the arm 35 while the vertical flange 18 engages the wall 36, the engaging parts being secured together by the fastening devices 37.

From the above detail description of the invention, it is believed that the construction and operation thereof will at once be apparent, and while there are herein shown and described the preferred embodiments of the present invention it is nevertheless to be understood that minor changes may be made therein without departing from the spirit and scope of the invention as claimed.

What is claimed as new is:—

1. In a corner post fastener for bedsteads, a socket member permanently secured to each corner post, cross rails anchored to the socket members, side rails having their ends received in adjacent socket members, and tensioned, resiliently releasable fastening devices extending through the socket members and side rail ends for anchoring the latter in position.

2. In a corner post fastener for bedsteads, a socket member permanently secured to each corner post, cross rails anchored to the socket members, said rails having their ends received in adjacent socket members, tensioned, resiliently releasable fastening devices extending through the socket members and side rail ends for anchoring the latter in position, said fastening devices including a strap member, a tensioned bolt extending through the strap member, socket member and side rail end, and a spring encircling said bolt for forcing outwardly upon said strap member.

3. In a corner post fastener for bedsteads, a socket member permanently secured to each corner post, cross rails anchored to the socket members, said rails having their ends received in adjacent socket members, tensioned, resiliently releasable fastening devices extending through the socket members and side rail ends for anchoring the latter in position, said fastening devices including a strap member, a tensioned bolt extending through the strap member, socket member and side rail end, the side rail ends having openings therein through which the strap member extends, and resilient means bearing against said strap member for withdrawing the latter's extensions from said openings when the tension is removed.

4. In a corner post fastener for bedsteads, a socket member permanently secured to each corner post, cross rails anchored to the socket members, said rails having their ends received in adjacent socket members, tensioned fastening devices extending through the socket members and side rail ends for anchoring the latter in position, said fastening devices including a strap member, a tensioned bolt extending through the strap member, socket member and side rail end, the side rail ends having openings therein through which the strap member extends, and said socket member having depressions receiving the ends of the strap member.

In testimony whereof I affix my signature.

KOIJ G. HADJIEFF.